Figure 1:
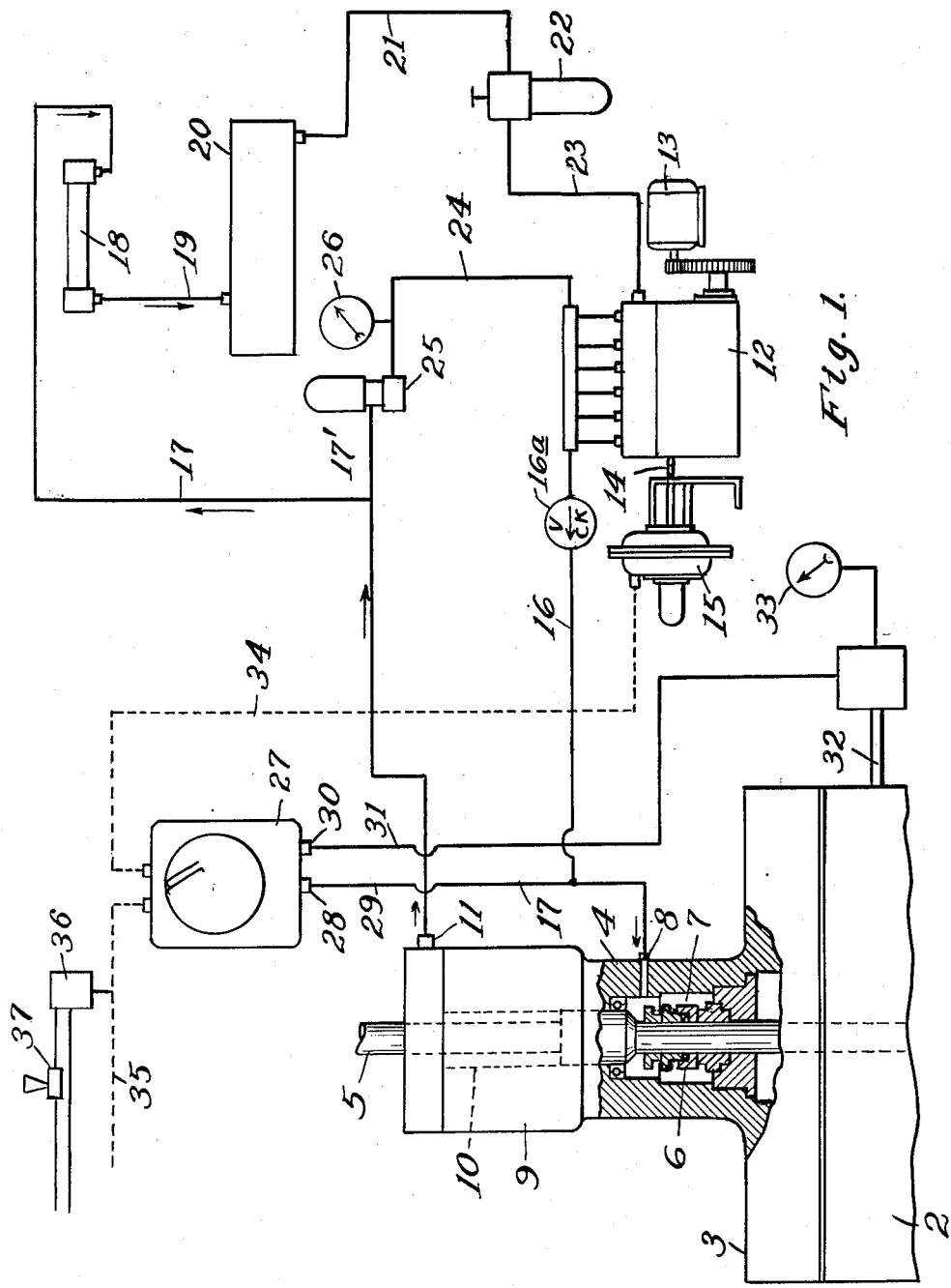

Patented Aug. 18, 1953

2,649,318

UNITED STATES PATENT OFFICE 2,649,318

PRESSURE LUBRICATING SYSTEM

Paul Skillman, New Kensington, Pa., assignor, by mesne assignments, to Blaw-Knox Company, Pittsburgh, Pa., a corporation of Delaware Application May 18, 1950, Serial No. 162,668

3 Claims. (Cl. 286—19)

This invention is for a pressure lubricating or cooling system especially designed for use with lubricated stuffing boxes, particularly stuffing boxes which are subjected to high pressures.

The invention will be hereinafter described in connection with the lubrication of the stuffing box of an autoclave, but it will be understood that this is by way of illustration, and that the invention is applicable to other uses and to stuffing boxes in other equipment.

As shown in Patent No. 2,398,944 to George E. Kopetz, granted April 23, 1946, it has heretofore been proposed to provide an autoclave with an agitator therein, and to have two stuffing boxes around the agitator shaft, there being an inner stuffing box and an outer one. Lubricant under pressure is supplied to a chamber between the two stuffing boxes and is maintained at a predetermined amount somewhat higher than the pressure in the autoclave. The inner stuffing box between the lubricant chamber and the autoclave is therefore subject to the differential pressure between the pressure in the autoclave and the pressure of the lubricant. The outer stuffing box is subjected to the differential pressure between the oil in the said chamber and atmospheric pressure.

In a copending application of James R. Shields, Serial No. 162,648, filed May 18, 1950, the outer stuffing box is disclosed as being a multi-stage packing, and provision is made for maintaining a predetermined pressure drop across each of the several stages of the outer stuffing box so as to apportion the drop in pressure more or less equally among the several stages.

Autoclave operations are frequently batch operations in which material is first introduced into the autoclave at atmospheric or relatively low pressure. As the operation proceeds, the pressure will gradually increase, perhaps over a period of several hours, to a maximum pressure which may be of an order in excess of 1,000 pounds per square inch. This pressure may be maintained for a period of several hours, and then the autoclave will be several hours in cooling down, during which time there may be gradual diminishing of the pressure.

Under these conditions of operation it will be seen that if oil is initially applied to the stuffing box at the maximum pressure of 1,000 pounds per square inch or more, there will be a considerable period of time when the differential between the oil pressure and the pressure in the autoclave is extremely high, tending to break down the packing in the inner stuffing box. Again when the autoclave is cooling off and the pressure in the autoclave begins to drop substantially below the oil pressure, there would be a considerable time where the differential pressure between the oil and the pressure in the autoclave would be quite substantial.

Therefore it is desirable that the pressure of the lubricant be maintained at a relatively constant value above the autoclave pressure and that the pressure of the lubricating oil be increased as the pressure in the autoclave increases, and be decreased as the pressure in the autoclave decreases, so as to maintain a substantially constant safe pressure differential across the inner of the two stuffing boxes.

The present invention has for its object to provide a system which will thus constantly maintain a substantially uniform predetermined differential of the lubricating pressure above the pressure in the autoclave or other vessel notwithstanding changes of pressure in the autoclave or fluctuations of pressure.

A further object of the invention is to provide a relatively simple, trouble-free system wherein this may be accomplished.

The invention is especially applicable for use in connection with a system as disclosed in the aforesaid Shields application, wherein there is a controlled pressure drop across the outer stage multi-stuffing box from a pressure above the pressure in the autoclave to atmospheric pressure.

According to the present invention, a circulating system is provided for forcing the oil, or lubricant, or cooling fluid, through the stuffing box continuously, a closed circulating system being provided. This system as shown includes a constant speed variable displacement pump. A servo-motor mechanism is provided for varying the displacement of the pump, and there is a control apparatus responsive on the one hand to the pressure in the autoclave, and on the other to lubricant pressure for operating such servo-motor mechanism. The system thus responds to increase or decrease the output of the pump to maintain a substantially constant differential between the autoclave pressure and the oil pressure.

Figure 2:
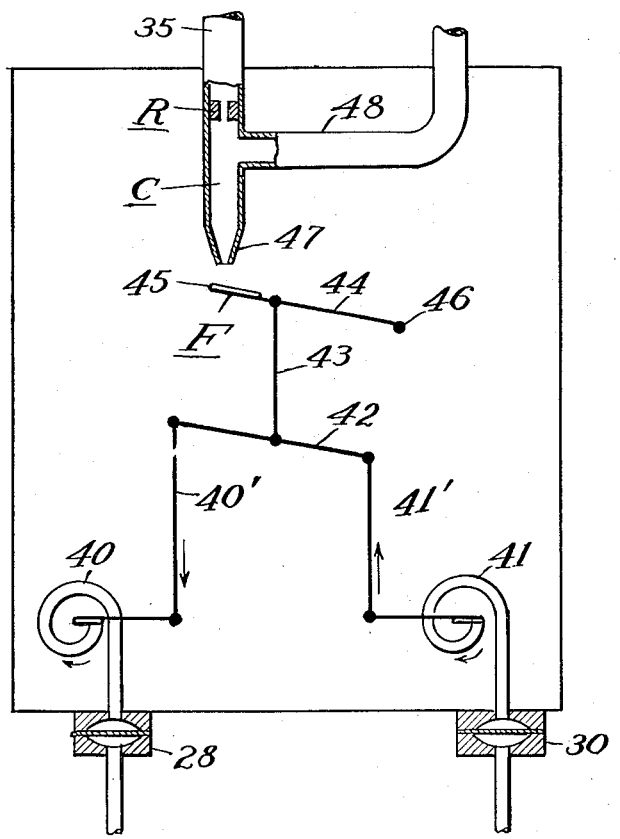

My invention may be more fully understood by reference to the accompanying drawings, in which:

Fig. 1 is a schematic view of an autoclave or other pressure apparatus equipped with my invention, the fluid pressure circuit and control devices being diagrammatically shown; and Fig. 2 is a somewhat schematic view illustrating a type of differential pressure controller useful in the system, and which in turn operates an air motor for changing the output of the pump.

In the drawings, 2 designates the body of the autoclave having a cover 3, the cover 3 having a nozzle or receptacle 4 through which passes a drive shaft 5 for turning an agitator (not shown) inside the autoclave. There is a stuffing box 6 in the lower portion of the nozzle or receptacle 4 through which the shaft 5 passes, and provision is made for introducing oil into a chamber 7 above this stuffing box by means of a nipple 8. Within the cylindrical shell 9 at the top of the nozzle is another stuffing box which may be of the type disclosed in the aforesaid Shields application, this being a multi-stage stuffing box. It is indicated in dotted lines at 10, and the arrangement is such that oil under pressure entering through the nipple 8 may flow into the chamber 7, thence up through lubricating passages in the stuffing box 10, the oil or cooling lubricant being discharged at a nipple 11 at the top of the outer stuffing box.

The construction and arrangement of the autoclave and stuffing boxes per se constitutes no part of the present invention, and such parts are therefore only schematically illustrated.

As previously indicated, the purpose of the present invention is to provide a system of supplying lubricant to the chamber 7 and to maintain this lubricant at a predetermined pressure above the pressure in the autoclave, notwithstanding changes or fluctuations in pressure in the autoclave. For supplying lubricant to the stuffing box, I may use a variable displacement high pressure pump, as for example a diesel fuel injection pump, which is schematically illustrated at 12. The details of the pump itself constitute no part of the present invention, but one pump suitable for the purpose is made by the American Bosch Corporation, and is designated by that company as its Type APE pump, and is illustrated in the bulletin published by that company marked "Form #3124 LKH." This pump is driven by a motor 13. It is provided with a variable output control rod 14, projecting from one end thereof, so that by moving the rod in or out, the displacement of the pump may be changed to increase or decrease the output of the pump.

According to the present invention, a servomotor means, such as a diaphragm air motor 15, is attached to the rod 14, this air motor being of a well-known construction, having a diaphragm which is biased by a spring to move in one direction, and which is moved in the opposite direction by an air pressure against the diaphragm.

The pump delivers the fluid which it discharges into a pipe 16 that connects to the chamber 7. The oil at substantially atmospheric pressure discharges from the nipple 11 into pipe 17, from whence it flows in the direction indicated by the arrows to an oil cooler 18 which may be any suitable heat exchange device, and thence through pipe 19 to oil reservoir 20. From oil reservoir 20, a pipe 21 leads to an oil filter 22, and thence through pipe 23 to the intake side of the pump 12. The discharge side of the pump is also connected through pipe 24 to a pressure-relief valve 25, and a pump pressure gauge 26. The relief valve 25 is set to open at a predetermined maximum pressure and discharge or bypass fluid to pipe 17 connected to the low pressure fluid return line 17. An outwardly-opening check valve 16a is indicated in the line 16.

At 27 there is indicated diagrammatically in Fig. 1 a differential pressure controller. This differential pressure controller has a nipple 28 connected to a line 29 which is connected to the pipe 16 adjacent the stuffing box of the autoclave. The differential pressure controller has a second nipple 30 connected through line 31 with a connection 32 leading to the interior of the autoclave, and 33 is a gauge that shows the autoclave pressure. By reason of these connections, the differential pressure controller to be hereinafter more fully described, is made responsive to the autoclave pressure on the one hand, and the oil supply pressure to the stuffing box on the other. The differential pressure controller operates through an air line 34, shown in dotted lines in Fig. 1, to vary the pressure on the diaphragm of the diaphragm air motor, and 35 designates an air supply line to the differential pressure controller, 35 being connected with a source of constant pressure air. 36 indicates a pressure responsive switch for operating an alarm 37 in the event of failure of air pressure in the line 35.

The differential pressure controller 27 schematically illustrated in Fig. 1 operates on a principle that is known to the art. In Fig. 2 I have illustrated more or less schematically the construction of such a differential pressure controller, and in this view 28 and 30 correspond to the nipples 28 and 30 of Fig. 1, 28 being the oil pressure to the stuffing box, and 30 being the autoclave pressure. Within the housing of the instrument there are two Bourdon coils 40 and 41, 40 being responsive to the oil pressure connected to the nipple 28, and 41 being responsive to the autoclave pressure communicated through the nipple 30. The arrows adjacent these coils indicate the direction of displacement as pressure increases in the Bourdon tubes. The coils are operatively connected through linkages 40' and 41' to opposite ends of the bar 42, and the other end of this link is connected by a link 43 to a lever 44 having a flap or vane 45 at one end and having a fixed fulcrum 46 at its other end.

Above the vane 45 is a nozzle 47 arranged to project a jet of air against the vane 45. Air from the constant pressure source is supplied to the nozzle through pipe 35, and R designates an orifice through which the flow of air from the pipe 35 to the nozzle chamber 47 is controlled. The nozzle chamber C within the nozzle 47 communicates through a branch pipe 48 with the line 34 leading to the diaphragm air motor.

The arrangement thus is such that air is continuously discharged from the nozzle against the flap or vane 45, and as long as the flap or vane remains in the same position, the impedance to the jet of air from the nozzle is not changed, and the pressure in line 34 remains constant. If pressures increase in the Bourdon tubes 40 and 41 equally, the differential bar 42 simply pivots about the end of the link and no change in the position of the flap or vane takes place. If, however, the tubes 40 and 41 are subjected to different pressures and therefore expanded differently, the differential will raise or lower the position of the vane F, thereby changing the impedance to the discharge of the jet of air from the nozzle 47. This will reflect itself in a change of pressure in the line 34, causing the diaphragm air motor to actuate the rod 14 and thereby change the displacement of the pump 12.

The arrangement is such that if the autoclave pressure increases, the diaphragm air motor will be operated to increase the displacement of the pump until a predetermined differential is again established.

In using the word lubricant, I include any sealing liquid or coolant suitable for circulation under pressure through stuffing boxes, and without limitation to oils having high lubricating properties. In chemical processes, not infrequently such oils may not be used, and the sealing fluid must be a liquid which is a poor lubricant in the ordinary sense, but adequate for such special application.

My invention therefore provides in a lubricating system, subject to wide pressure variations, an arrangement whereby the lubricating pressure is built up as a controlling pressure is built up, and diminishes as a controlling pressure is diminished, with a substantially constant differential being maintained. It provides particularly in a stuffing box system having inner and outer stuffing boxes, an arrangement whereby a substantially constant differential pressure may be maintained across the inner stuffing box notwithstanding that wide variations of pressure on the inner side of the stuffing box will occur.

In the diagram I have shown and described one particular form of controller for the air motor, but it will be understood that various differential pressure controllers, both fluid pressure and electric, are known or may be provided, and my invention is not to be understood as being limited to any particular construction or type of differential pressure controller unit, and that various other variable pressure sources may be used in lieu of the specific oil pump referred to.

It will also be understood that various other changes and modifications may be made in the invention, and that alteration in the connections may be made according to the requirements of a particular piece of apparatus, and that the invention is not restricted to use with stuffing boxes of autoclaves, but may find application to various other stuffing boxes or to other instances where controlled differential of the lubricant pressure to a piece of equipment is desirable.

I claim:

1. The combination with a pressure vessel having a motion-transmitting rod passing from the interior to the exterior thereof, spaced inner and outer stuffing boxes on the vessel around the rod, there being a fluid receiving space between the inner and outer packings, means including a closed fluid circulating system and variable output pump for supplying fluid to said space, and means responsive to the pressure in the vessel and the pressure in the system connected with the pump and connected with said closed circuit for maintaining a controlled difference of pressure between the fluid in said vessel and the fluid in said space.

2. The combination with a pressure vessel having a motion-transmitting rod passing from the interior to the exterior thereof, spaced inner and outer stuffing boxes on the vessel around the rod, there being a fluid receiving space between the inner and outer packings, means including a closed fluid circulating system and variable output pump for supplying fluid to said space, a control mechanism responsive to pressure in the vessel and to the pressure of the fluid in the system connected with said pump and connected in said closed circuit, and means actuated by the control mechanism for varying the pump pressure so as to maintain a generally constant pressure differential between the fluid in the vessel and the fluid in said space.

3. The combination with a pressure vessel having a stuffing box subjected on one side to the pressure in the pressure vessel, the other side of the stuffing box being in a chamber, means including a variable output pump and a closed fluid circulating system for supplying fluid under pressure to said chamber, servo-motor means for varying the output of the pump to vary its pressure, and a differential pressure controller for actuating said servo-motor means connected with said said pump and connected in said circuit, said differential pressure controller being responsive to relative variations in the pressure in said pressure vessel and the pressure in the output of the pump, and serving to maintain a substantially constant differential in pressure between the pressure in the pressure vessel and the pressure in said chamber.

PAUL SKILLMAN.

References Cited in the file of this patent

UNITED STATES PATENTS

| Number | Name | Date |
| --- | --- | --- |
| 1,418,951 | Martin | June 6, 1922 |
| 1,418,952 | Martin | June 6, 1922 |
| 1,681,075 | Wiegert | Aug. 14, 1928 |
| 2,347,751 | Reeves et al. | May 2, 1944 |
| 2,436,514 | Jennings | Feb. 24, 1948 |